United States Patent
Ma et al.

(10) Patent No.: US 11,694,472 B2
(45) Date of Patent: Jul. 4, 2023

(54) DISPLAY PANEL, DISPLAY APPARATUS, AND METHOD FOR PREPARING DISPLAY PANEL

(71) Applicants: Beijing BOE Display Technology Co., Ltd., Beijing (CN); BOE Technology Group Co., Ltd., Beijing (CN)

(72) Inventors: Xinli Ma, Beijing (CN); Dongchuan Chen, Beijing (CN); Xueqiang Qian, Beijing (CN); Bingyang Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/630,123

(22) PCT Filed: Mar. 9, 2021

(86) PCT No.: PCT/CN2021/079718
§ 371 (c)(1),
(2) Date: Jan. 25, 2022

(87) PCT Pub. No.: WO2021/213037
PCT Pub. Date: Oct. 28, 2021

(65) Prior Publication Data
US 2022/0262159 A1    Aug. 18, 2022

(30) Foreign Application Priority Data
Apr. 20, 2020 (CN) .......................... 202010310598.X

(51) Int. Cl.
*G06V 40/13* (2022.01)
*G06V 10/147* (2022.01)
(Continued)

(52) U.S. Cl.
CPC ...... *G06V 40/1324* (2022.01); *G02F 1/13338* (2013.01); *G02F 1/133528* (2013.01);
(Continued)

(58) Field of Classification Search
CPC ............. G06V 40/1324; G06V 10/147; G06V 40/1318; G06V 40/1329; G02F 1/13338;
(Continued)

(56) References Cited

U.S. PATENT DOCUMENTS 10,614,283 B2    4/2020  He et al.
2017/0286743 A1* 10/2017 Lee ..................... G06V 40/1318
(Continued)

FOREIGN PATENT DOCUMENTS

CN    109521590 A    3/2019
CN    110501833 A    11/2019
(Continued)

OTHER PUBLICATIONS

CN202010310598.X first office action.

*Primary Examiner* — Premal R Patel
(74) *Attorney, Agent, or Firm* — IPro, PLLC

(57) ABSTRACT

The embodiments of the present disclosure provide a display panel, a display device, and a method for manufacturing the display panel. The display panel comprises: a display module comprising a fingerprint recognition component; a packaging cover plate located on a light emergent side of the display module; and a plurality of light path adjustment devices located between the packaging cover plate and the fingerprint recognition component, wherein each of the light path adjustment devices comprises an optical fiber structure and a convex lens structure, which are arranged opposite each other, with the convex lens structure being located on the side of the optical fiber structure that is away from the packaging cover plate; and the light path adjustment devices
(Continued)

are configured to adjust incident light reflected by a finger so as to reduce the angle of divergence of light entering the fingerprint recognition component.

14 Claims, 5 Drawing Sheets

(51) Int. Cl.
    *G02F 1/1333* (2006.01)
    *G02F 1/1335* (2006.01)
    *G06F 3/041* (2006.01)
    *G06F 3/042* (2006.01)

(52) U.S. Cl.
    CPC .......... *G06F 3/0412* (2013.01); *G06F 3/0421* (2013.01); *G06V 10/147* (2022.01); *G06V 40/1318* (2022.01); *G06V 40/1329* (2022.01); *G06F 2203/04103* (2013.01)

(58) Field of Classification Search
    CPC ......... G02F 1/133528; G02F 1/133524; G02F 1/133526; G06F 3/0412; G06F 3/0421; G06F 2203/04103
    See application file for complete search history.

(56) References Cited

U.S. PATENT DOCUMENTS

| | | | |
|---|---|---|---|
| 2019/0303639 A1* | 10/2019 | He | G06V 40/1394 |
| 2020/0097699 A1 | 3/2020 | Zeng et al. | |
| 2020/0193126 A1 | 6/2020 | Shi et al. | |
| 2020/0387684 A1* | 12/2020 | Setlak | H01L 27/3234 |
| 2021/0019017 A1* | 1/2021 | Yeke Yazdandoost | H01L 51/44 |
| 2021/0326570 A1* | 10/2021 | Liu | G06V 10/147 |

FOREIGN PATENT DOCUMENTS

| | | |
|---|---|---|
| CN | 210052180 U | 2/2020 |
| CN | 111507273 A | 8/2020 |

\* cited by examiner

DISPLAY PANEL, DISPLAY APPARATUS, AND METHOD FOR PREPARING DISPLAY PANEL

CROSS REFERENCE TO RELATED APPLICATIONS

This application is a national phase entry under 35 U.S.C. § 371 of International Application No. PCT/CN2021/079718, filed on Mar. 9, 2021, which claims priority of Chinese Patent Application No. 202010310598.X, filed with the China National Intellectual Property Administration (CNIPA) on Apr. 20, 2020 and entitled "Display Panel, Display Apparatus, and Method for Preparing Display Panel", the entire content of which is incorporated herein by reference.

FIELD

The present disclosure relates to the technical field of display, in particular to a display panel, a display apparatus, and a method for preparing the display panel.

BACKGROUND

With the rapid development of the display equipment industry, a fingerprint recognition technology has attracted more and more attention, and the practical application of an under-screen fingerprint recognition technology has become a popular demand. The most widely used in the under-screen fingerprint recognition technology is an under-screen optical fingerprint recognition technology. The under-screen optical fingerprint recognition technology can use light emitted by a screen as a light source. The light emitted by the screen will carry fingerprint information of a finger after shining on the finger on the top of the screen, and a light signal carrying the fingerprint information will be received by a fingerprint sensor for fingerprint recognition.

SUMMARY

Embodiments of the present disclosure provide a display panel, including:

a display module, including a fingerprint recognition component;

a packaging cover plate, located on a light emergent side of the display module; and a plurality of light path adjustment devices, located between the packaging cover plate and the fingerprint recognition component.

Each of the light path adjustment devices includes an optical fiber structure and a convex lens structure, which are disposed opposite each other. The convex lens structure is located on a side, facing away from the packaging cover plate, of the optical fiber structure. The light path adjustment devices are configured to adjust incident light reflected by a finger so as to reduce an angle of divergence of light entering the fingerprint recognition component.

In a possible implementation, the fingerprint recognition component includes a plurality of recognition devices distributed in an array. The plurality of light path adjustment devices are distributed in an array.

There is an overlap region between an orthographic projection of one of the recognition devices on the packaging cover plate and an orthographic projection of at least one light path adjustment device on the packaging cover plate.

In a possible implementation, a center of a light outlet of the optical fiber structure overlaps with a focal point of the convex lens structure.

In a possible implementation, a first protective layer is disposed between the optical fiber structure and the convex lens structure.

In a possible implementation, a refractive index of the first protective layer is smaller than a refractive index of the optical fiber structure and smaller than a refractive index of the convex lens structure.

In a possible implementation, the light path adjustment devices are integrated on the packaging cover plate, and integrated on a side, facing the display module, of the packaging cover plate.

In a possible implementation, the display module includes a color film substrate and an array substrate which are disposed opposite each other, and the light path adjustment devices are integrated on the color film substrate.

In a possible implementation, the color film substrate includes a substrate, and the light path adjustment devices are integrated on a side, facing away from the array substrate, of the substrate.

In a possible implementation, the display panel further includes a first polarizer, and the first polarizer is located on a side, facing away from the substrate, of the light path adjustment devices.

In a possible implementation, the color film substrate further includes a color film layer located on a side, facing away from the polarizer, of the substrate, and the fingerprint recognition component is integrated on the color film substrate and integrated between the substrate and the color film layer.

In a possible implementation, the fingerprint recognition component is integrated on the array substrate and integrated on a side, facing the color film substrate, of the array substrate.

Embodiments of the present disclosure further provide a display apparatus, including the display panel as provided by the embodiments of the present disclosure.

Embodiments of the present disclosure further provide a method for preparing the display panel as provided by the embodiments of the present disclosure, including:

forming a fingerprint recognition component in a display module; and forming a plurality of light path adjustment devices between a packaging cover plate and the fingerprint recognition component.

In a possible implementation, the forming the plurality of light path adjustment devices between the packaging cover plate and the fingerprint recognition component, includes:

forming a plurality of optical fiber structures on one side of the packaging cover plate through a nano imprinting process;

forming a first protective layer on a side, facing away from the packaging cover plate, of the optical fiber structures;

forming a plurality of convex lens structures on a side, facing away from the optical fiber structures, of the first protective layer through the nano imprinting process; and attaching the packaging cover plate formed with the convex lens structures and the optical fiber structures to a light emergent side of the display module.

In a possible implementation, the forming the fingerprint recognition component in the display module, includes:

forming the fingerprint recognition component on a side of a substrate of a color film substrate;

forming a second protective layer on a side, facing away from the substrate, of the fingerprint recognition component;

forming a color film layer on a side, facing away from the fingerprint recognition component, of the second protective layer; and oppositely combining the color film substrate formed with the color film layer and an array substrate to form the display module.

DETAILED DESCRIPTION OF THE EMBODIMENTS

In order to make the objectives, technical solutions, and advantages of embodiments of the present disclosure clearer, the technical solutions of the embodiments of the present disclosure will be described clearly and completely in combination with the accompanying drawings of the embodiments of the present disclosure. Apparently, the described embodiments are some, but not all, embodiments of the present disclosure. Based on the described embodiments of the present disclosure, all other embodiments attainable by those ordinarily skilled in the art without involving any inventive effort are within the protection scope of the present disclosure.

Unless defined otherwise, technical or scientific terms used in the present disclosure shall have the ordinary meaning as understood by those ordinarily skilled in the art to which the present disclosure belongs. The terms "first", "second", and similar referents used in the present disclosure do not denote any order, quantity, or importance, but rather are used solely to distinguish one from another. The words "include" or "contain", and the like mean that an element or article that precedes the word is inclusive of the element or article listed after the word and equivalents thereof, but does not exclude other elements or articles. The terms "connection" or "connected", and the like are not limited to physical or mechanical connections, but may include electrical connections, whether direct or indirect. The terms "upper", "lower", "left", "right", and the like are used merely to denote a relative positional relationship that may change accordingly when the absolute position of an object being described changes.

In order to keep the following description of embodiments of the present disclosure clear and concise, the present disclosure omits detailed descriptions of known functions and known assemblies.

Figure 1:
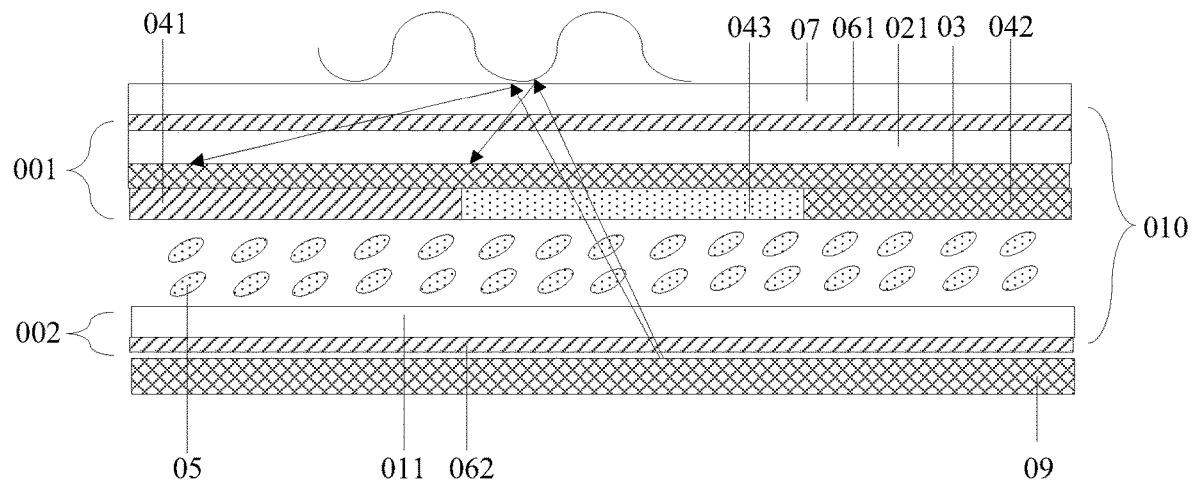
FIG. 1 is a schematic structural diagram of a display panel in related art.

In the related art, as shown in FIG. 1, a liquid crystal display screen may include a display module 010, a packaging cover plate 07 located on a light emergent side of the display module 010, and a backlight source 09 located on a side, facing away from the packaging cover plate 07, of the display module 010. The display module 010 may include a color film substrate 001 and an array substrate 002 which are disposed opposite each other, and a liquid crystal layer 05 located between the color film substrate 001 and the array substrate 002. The color film substrate 001 may include a first substrate 021, a fingerprint recognition component 03 located on a side, facing away from the packaging cover plate 07, of the first substrate 021, a color film layer located on a side, facing away from the packaging cover plate 07, of the fingerprint recognition component 03 (the color film layer may include a red color filter 041, a green color filter 043, and a blue color filter 042), and a first polarizer 061 located on a side, facing the packaging cover plate 07, of the first substrate 021. The array substrate 002 may include a second substrate 011, and a second polarizer 062 located on a side, facing away from the color film substrate 001, of the second substrate 011. That is, the fingerprint recognition component 03 is made on the color film substrate 001. Light emitted by the backlight source 09 passes through the display module 010 and the packaging cover plate 07 and then is reflected by a user's fingerprint back to the fingerprint recognition component 03. A difference exists between an intensity of light reflected from fingerprint peaks and an intensity of light reflected from fingerprint valleys. Fingerprint recognition can be realized through a photoelectric conversion of the fingerprint recognition component 03 by using the light intensity difference. As shown in FIG. 1, according to the ordinary fingerprint recognition component 03, when light emitted by the backlight source 09 passes through a long transmission path and is irradiated on the fingerprint recognition component 03, the angle of divergence of the light is relatively large, thus light spots (stripes) reflected from the fingerprint peaks and valleys cannot be clearly separated on a fingerprint sensor, which leads to a decline in the recognition ability.

Figure 2:
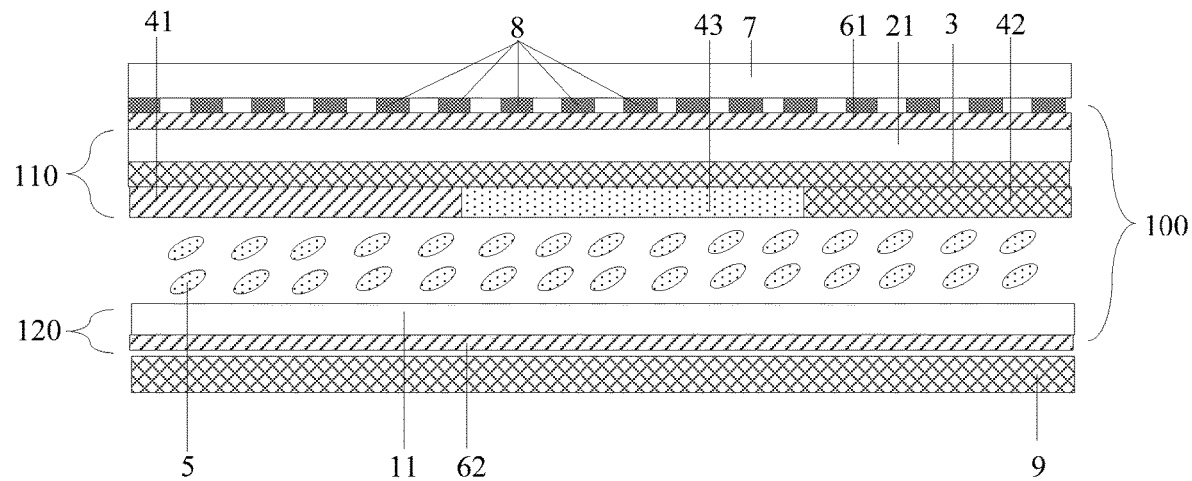
FIG. 2 is a schematic structural diagram of light path adjustment devices located on a packaging cover plate provided by an embodiment of the present disclosure.
Figure 7:
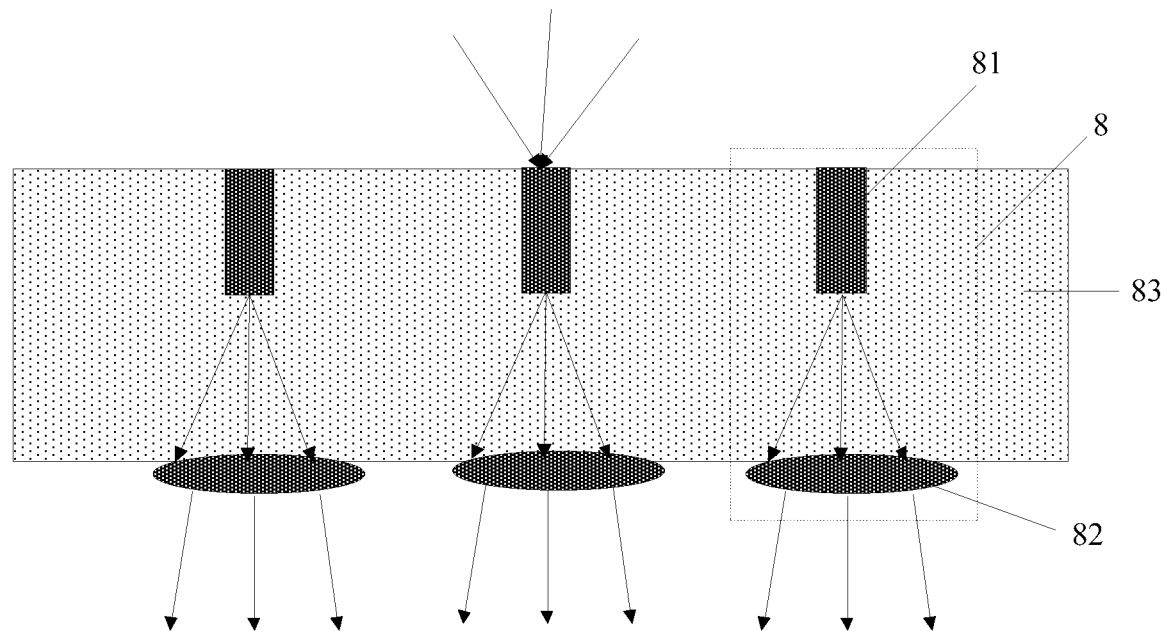
FIG. 7 is a schematic diagram of positions of optical fiber structures and convex lens structures provided by an embodiment of the present disclosure.

Based on this, referring to FIG. 2 and FIG. 7, embodiments of the present disclosure provide a display panel. The display panel includes a display module 100, a packaging cover plate 7, and a plurality of light path adjustment devices 8.

The display module 100 includes a fingerprint recognition component 3.

T packaging cover plate 7 is located on a light emergent side of the display module 100. For example, as shown in FIG. 2, an upper side of the display module 100 is a light emergent side, so the packaging cover plate 7 may be located above the display module 100. The light emergent side may be the side of a display frame viewed by a user when using the display panel. The packaging cover plate 7 may be a glass cover plate.

The light path adjustment devices 8 are located between the packaging cover plate 7 and the fingerprint recognition component 3. Each of the light path adjustment devices includes an optical fiber structure 81 and a convex lens structure 82. The optical fiber structure 81 and the convex lens structure 82 are disposed opposite each other. The convex lens structure 82 is located on a side, facing away from the packaging cover plate 7, of the optical fiber structure 81. The light path adjustment devices 8 are configured to adjust incident light reflected by a finger so as to reduce an angle of divergence of light entering the fingerprint recognition component 3.

Figure 3:
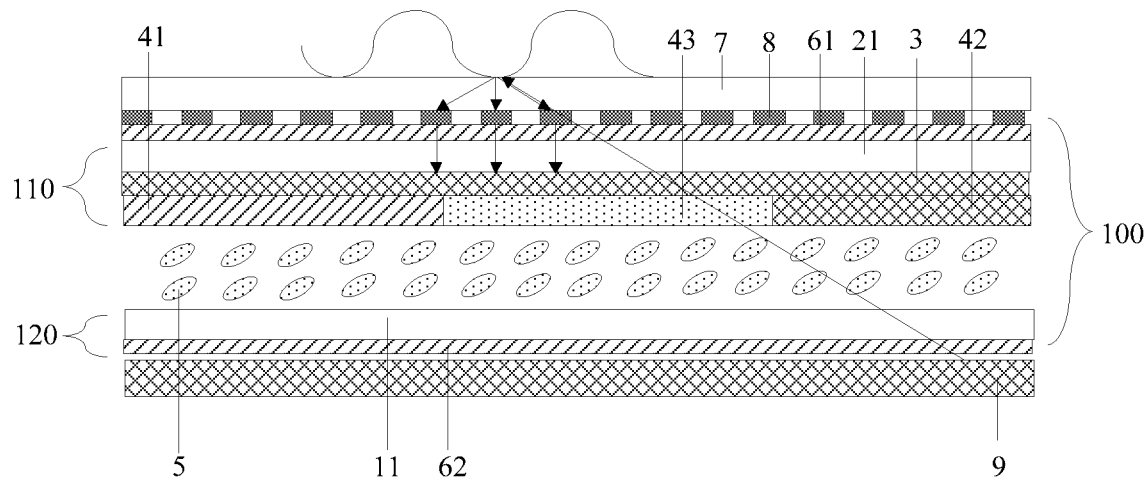
FIG. 3 is a schematic diagram of light propagation provided by an embodiment of the present disclosure.

In embodiments of the present disclosure, by arranging the light path adjustment devices 8 between the packaging cover plate 7 and the fingerprint recognition component 3, the light path adjustment devices 8 can adjust a light path of the light incident on the light path adjustment devices 8 and reflected by the finger, so as to reduce the angle of divergence of the light entering the fingerprint recognition component. As shown in FIG. 3, that is, the angle of divergence of the relatively diverged light originally incident on the fingerprint recognition component 3 can be reduced, and then the problem that as the angle of divergence of the light is relatively large, light spots (stripes) reflected from fingerprint peaks and valleys cannot be clearly separated on the fingerprint recognition component 3, which leads to a decline in a fingerprint recognition ability, is solved.

In some implementations, as shown in FIG. 2, the display panel provided by embodiments of the present disclosure may be a liquid crystal display panel. The display module may include a color film substrate 110 and an array substrate 120 which are disposed opposite each other, and a liquid crystal layer 5 located between the color film substrate 110 and the array substrate 120. A first polarizer 61 is located on a side, facing away from the array substrate 120, of the color film substrate 110. A second polarizer is located on a side, facing away from the color film substrate 110, of the array substrate 120. A backlight source 9 is located on the side, facing away from the packaging cover plate 7, of the display module 100. The color film substrate 110 may include a substrate 21, and a color film layer located on a side, facing the array substrate 120, of the substrate 21 (the color film layer may include a red color filter 41, a green color filter 43, and a blue color filter 42). The array substrate 120 may include a second substrate 11 (the substrate 21 of the color film substrate 110 may be referred to as a first substrate), and a second polarizer 62 located on a side, facing away from the color film substrate 110, of the second substrate 11.

In some implementations, positions of the light path adjustment devices 8 may be integrated in the packaging cover plate 7 or integrated in the display module 100, which will be described below with specific examples.

For example, referring to FIG. 2, the light path adjustment devices 8 are integrated on the packaging cover plate 7. For example, the light path adjustment devices 8 are integrated on a side, facing the display module 100, of the packaging cover plate 7. That is, during preparing, the light path adjustment devices 8 may be formed on the packaging cover plate 7, and then the packaging cover plate 7 formed with the light path adjustment devices 8 is attached to the display module 100. In some embodiments of the present disclosure, the light path adjustment devices 8 are integrated on the side, facing the display module 100, of the packaging cover plate 7. Since the fingerprint recognition component 3 is located in the display module 100, the light path adjustment devices 8 may be located on a light path between the finger and the fingerprint recognition component 3. Compared to the integration of the light path adjustment devices 8 in the display module 100, due to the fact that more structures of the display module 100 itself need to be prepared (for example, pixel electrodes, common electrodes, transistors, and the color film layer need to be prepared in the display module 100), and the packaging cover plate 7 itself needs to be prepared with fewer structures, more setting space may be provided for the light path adjustment devices 8, the other structures of the display panel do not need to be changed to a large extent, and preparing process is convenient. Moreover, compared to the preparing of the light path adjustment devices 8 on the side, facing away from the display module 100, of the packaging cover plate 7, that is, on an outer surface of the packaging cover plate 7, the light path adjustment devices 8 in some embodiments of the present disclosure are prepared on the side, facing the display module 100, of the packaging cover plate 7, so that the light path adjustment devices 8 are prevented from being worn out greatly during the use of the display panel and affecting the light adjustment accuracy of the light path adjustment devices 8.

Figure 4:
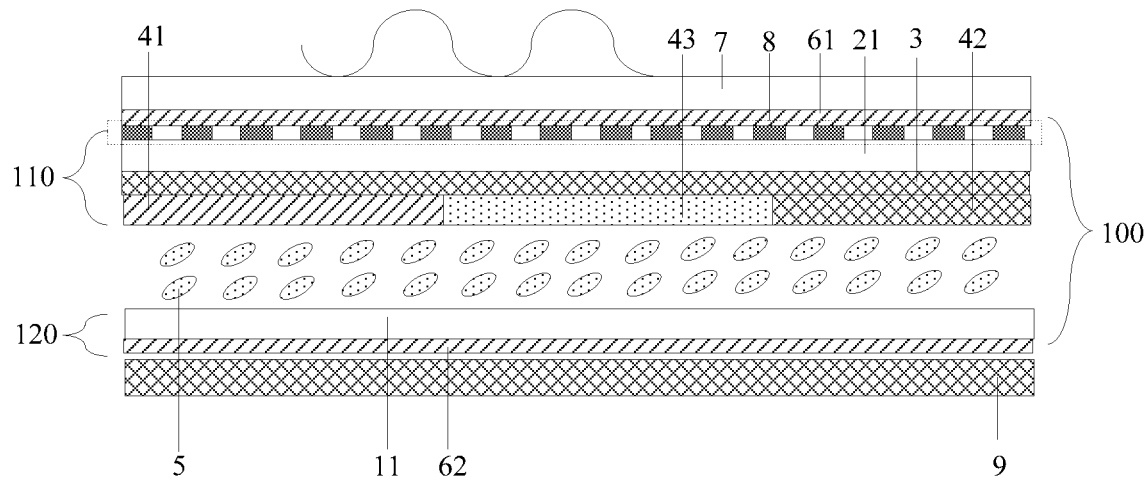
FIG. 4 is a schematic structural diagram of light path adjustment devices located on a color film substrate provided by an embodiment of the present disclosure.

For another example, referring to FIG. 4, the light path adjustment devices 8 are integrated in the display module 100. For example, the light path adjustment devices 8 are integrated on the color film substrate 110, e.g., integrated on a side, facing away from the array substrate 120, of the substrate 21 of the color film substrate 110, that is, a side facing the package cover plate 7. For example, the color film substrate 110 includes the substrate 21, and the light path adjustment devices 8 may be integrated between the substrate 21 and the first polarizer 61. That is, during preparing, the light path adjustment devices 8 may be formed on one side of the substrate 21 of the color film substrate 110, and then the first polarizer 61 may be attached to a side, facing away from the substrate 21, of the light path adjustment devices 8.

Figure 5:
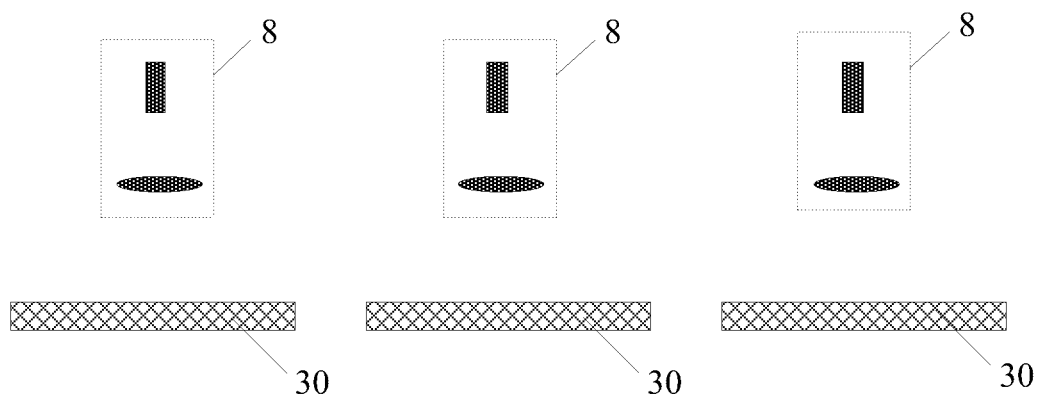
FIG. 5 is a schematic structural diagram of a one-to-one correspondence between recognition devices and light path adjustment devices provided by an embodiment of the present disclosure.
Figure 6:
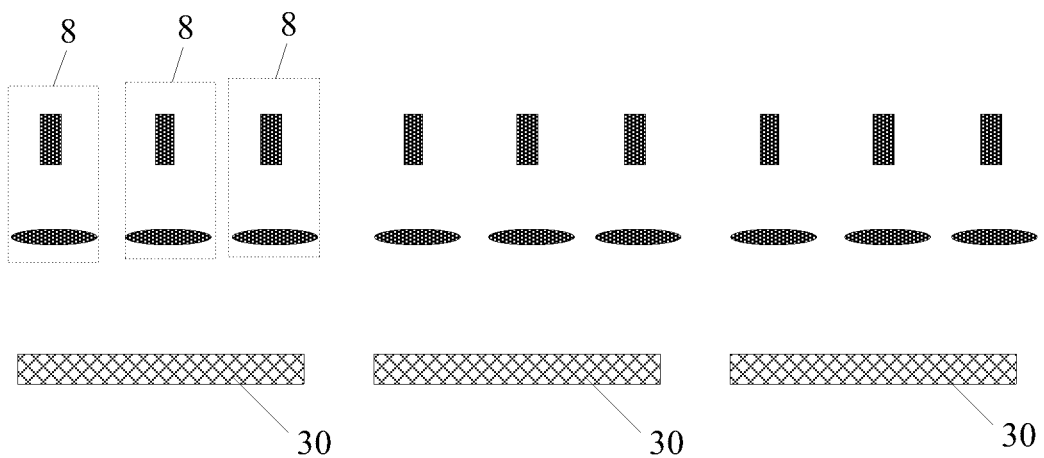
FIG. 6 is a schematic structural diagram of a plurality of light path adjustment devices corresponding to one recognition device provided by an embodiment of the present disclosure.

In some implementations, the fingerprint recognition component 3 in the embodiments of the present disclosure may be a full-screen fingerprint recognition component, and fingerprint recognition can be realized at any position of the display panel. For example, the fingerprint recognition component 3 includes a plurality of recognition devices 30 distributed in an array. The plurality of light path adjustment devices 8 are distributed in an array. There is an overlap region between an orthographic projection of the recognition devices 30 on the packaging cover plate 7 and an orthographic projection of at least one light path adjustment device 8 on the packaging cover plate 7. For example, as shown in FIG. 5, the recognition devices 30 correspond to the light path adjustment devices 8 in a one-to-one mode. There is an overlap region between the orthographic projection of one recognition device 30 on the packaging cover plate 7 and the orthographic projection of one light path adjustment device 8 on the packaging cover plate 7. That is, if sizes of the recognition device 30 and the light path adjustment device 8 are not much different, the recognition devices 30 and the light path adjustment devices 8 that narrows the angle of divergence of the light may be in one-to-one correspondence. Alternatively, in some implementations, as shown in FIG. 6, it is also possible that one recognition device 30 corresponds to multiple light path adjustment devices 8. There is an overlap region between the orthographic projection of one recognition device 30 on the packaging cover plate 7 and the orthographic projections of the multiple (three in FIG. 5) light path adjustment devices 8 on the packaging cover plate 7. That is, if an area of a recognition device 30 is much larger than an area of one light path adjustment device 8 for narrowing light rays, one recognition device 30 may correspond to multiple light path adjustment devices. 8, so that more light rays with a smaller angle of divergence are on the recognition devices 30.

In some implementations, as shown in FIG. 7, a center of a light outlet of an optical fiber structure 81 overlaps with a focal point of the corresponding convex lens structure 82. In the embodiments of the present disclosure, each light path adjustment device 80 includes the optical fiber structure 81 and the convex lens structure 82 which are disposed opposite each other. For the light reflected by the finger, the light first passes through the optical fiber structure 81, and then enters the convex lens structure 82. By controlling a positional relationship of the optical fiber structure 81 and the convex lens structure 82, the light incident on the light path adjustment device 80 outputs as parallel light or approximately parallel light. Through an arrangement of the optical fiber structures 81, the light incident on the light path adjustment devices in different directions may be collected, and totally reflected in the light path adjustment devices, so that the light is concentrated and transmitted with low loss. It should be noted that during preparing, due to process errors, it is difficult to meet an exact overlap between the center of the light outlet of the optical fiber structure 81 and the focal point of the corresponding convex lens structure 82. Therefore, in the embodiments of the present disclosure, the center of the light outlet of the optical fiber structure 81 and the focal point of the corresponding convex lens structure 82 overlapping can be understood as a position difference between the center of the light outlet of the optical fiber structure 81 and the focal point of the corresponding convex lens structure 82 within a preset range.

In some implementations, a first protective layer 83 is disposed between the optical fiber structures 81 and the convex lens structures 82. That is, in some implementations, the optical fiber structures 81 may be formed first, and then the first protective layer 83 is formed on the surface of the optical fiber structures 81, and then the convex lens structures 82 are formed. For example, a refractive index of the first protective layer 83 is smaller than a refractive index of the optical fiber structures 81 and smaller than a refractive index of the convex lens structures 82. In some embodiments of the present disclosure, the first protective layer 83 is disposed between the optical fiber structures 81 and the convex lens structures 82, which can protect the optical fiber structures 81. Further the refractive index of the first protective layer 83 is smaller than the refractive index of the optical fiber structure 81, so that the light can be totally reflected inside and be transmitted in the optical fiber structures 81. The refractive index of the first protective layer 83 is smaller than the refractive index of the convex lens structures 82, so that the convex lens structures 82 have a function of converging the light.

In some implementations, for the fingerprint recognition component 3 in the embodiments of the present disclosure, the fingerprint recognition component 3 may be integrated in the color film substrate 110 or the array substrate 120, which will be described below with specific examples.

Figure 8:
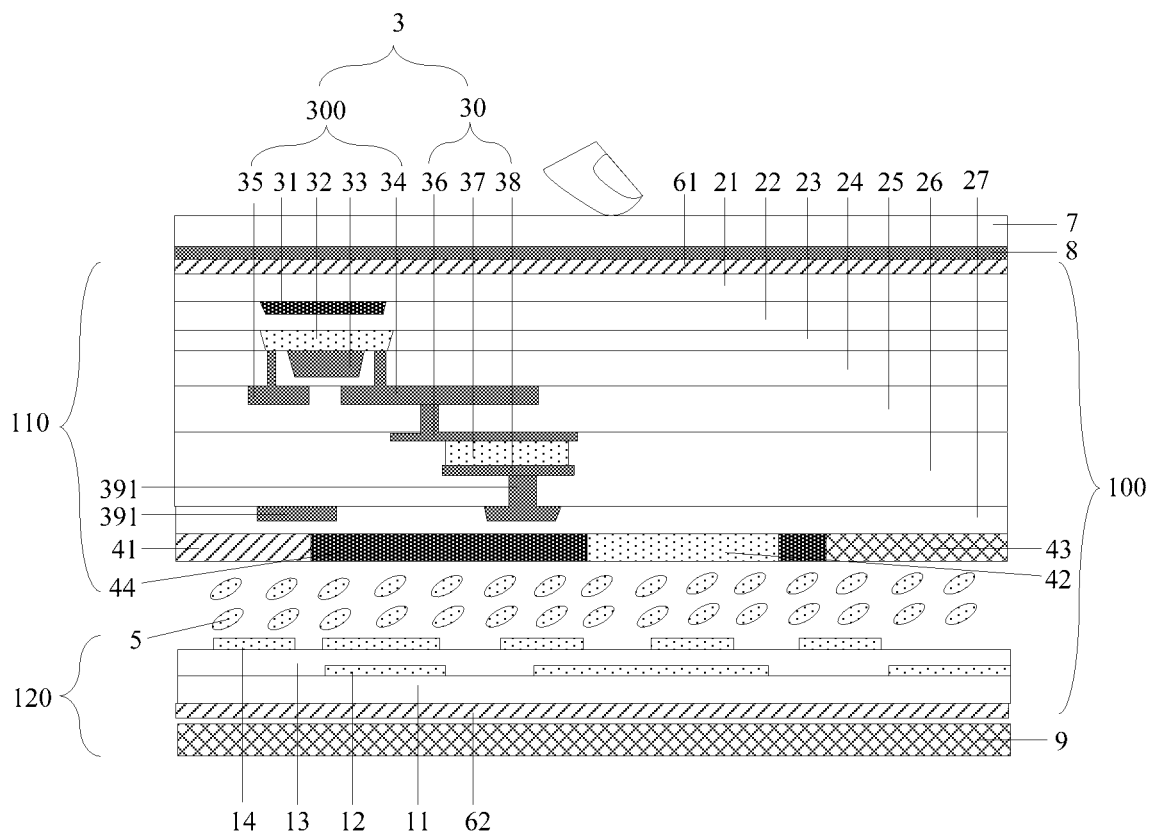
FIG. 8 is a schematic structural diagram of a fingerprint recognition component located on a color film substrate provided by an embodiment of the present disclosure.

For example, referring to FIG. 2 and FIG. 8, FIG. 8 shows a schematic structural distribution diagram of a fingerprint recognition component 3, which is located between the substrate 21 and the color film layer. That is, in some embodiments of the present disclosure, the fingerprint recognition component 3 is integrated on the color film substrate 110 and is located between the substrate 21 and the color film layer of the color film substrate 110. During preparing, the fingerprint recognition component 3 may be prepared through photomasking, exposing, development, etching, and other processes, and then the red, green, and blue color filters, a black matrix, and columnar spacers are prepared to complete the preparing of the color film substrate 110.

In some embodiments, when the fingerprint recognition component 3 is integrated on the color film substrate 110, the fingerprint recognition component 3 may include a first transistor 300 located on the substrate 21 and configured to drive the fingerprint recognition component 3, and the recognition devices 30 located on a side, facing away from the substrate 21, of the transistor 300. The first transistor 300 may include a light-shielding layer 31, a first insulating layer 22, an active layer 32, a second insulating layer 23, a gate 33, a third insulating layer 24, a source and drain layer (for example, may include a source electrode 34 and a drain electrode 35), and a fourth insulating layer 25 which are located sequentially on the substrate 21. Each recognition device 30 may include a second electrode 36, a photosensitive film layer 37, and a first electrode 38 which are sequentially located on a side, facing away from the source and drain layer, of the fourth insulating layer 25. A planarization layer 26, a third electrode 391, and a fifth insulating layer 27 are sequentially disposed on a side, facing away from the recognition devices 30, of the first electrode of the color film substrate 110. The red color filter 41, the green color filter 42, the blue color filter 43, and the black matrix 44 may be disposed on a side, facing away from the recognition devices 30, of the fifth insulating layer 27. The recognition devices 30 may be located between adjacent color filters, that is, at the location of the black matrix 44, so as to avoid the location of pixels and perform normal display. The second electrode 36 may be electrically connected to one of a source electrode or a drain electrode in the source and drain layer through a via hole penetrating the fourth insulating layer 25. The third electrode 391 may be electrically connected to the first electrode 38 through a via hole penetrating the planarization layer 26. The third electrode 391 may be a signal line that provides an electrical signal to the first electrode 38. For the array substrate 120, the array substrate 120 may include a second substrate 11, and further include a common electrode 12 (the common electrode 12 is multiplexed as a touch emitting electrode), a sixth insulating layer 13 and a pixel electrode 14 which are sequentially located on a side, facing the color film substrate 110, of the second substrate 11. The second polarizer 62 is further disposed in the array substrate 120 on a side, facing away from the color film substrate 110, of the second substrate 11. The second polarizer 62 may has a polarization direction perpendicular to a polarization direction of the polarizer 61 (that is, the first polarizer) of the color film substrate 110. The liquid crystal layer 5 is disposed between the color film substrate 110 and the array substrate 120. The side, facing away from the packaging cover plate 7, of the display module 100 may also be provided with the backlight source 9, and the light reflected by the finger may be light irradiated by the backlight source 9 to the finger.

Figure 9:
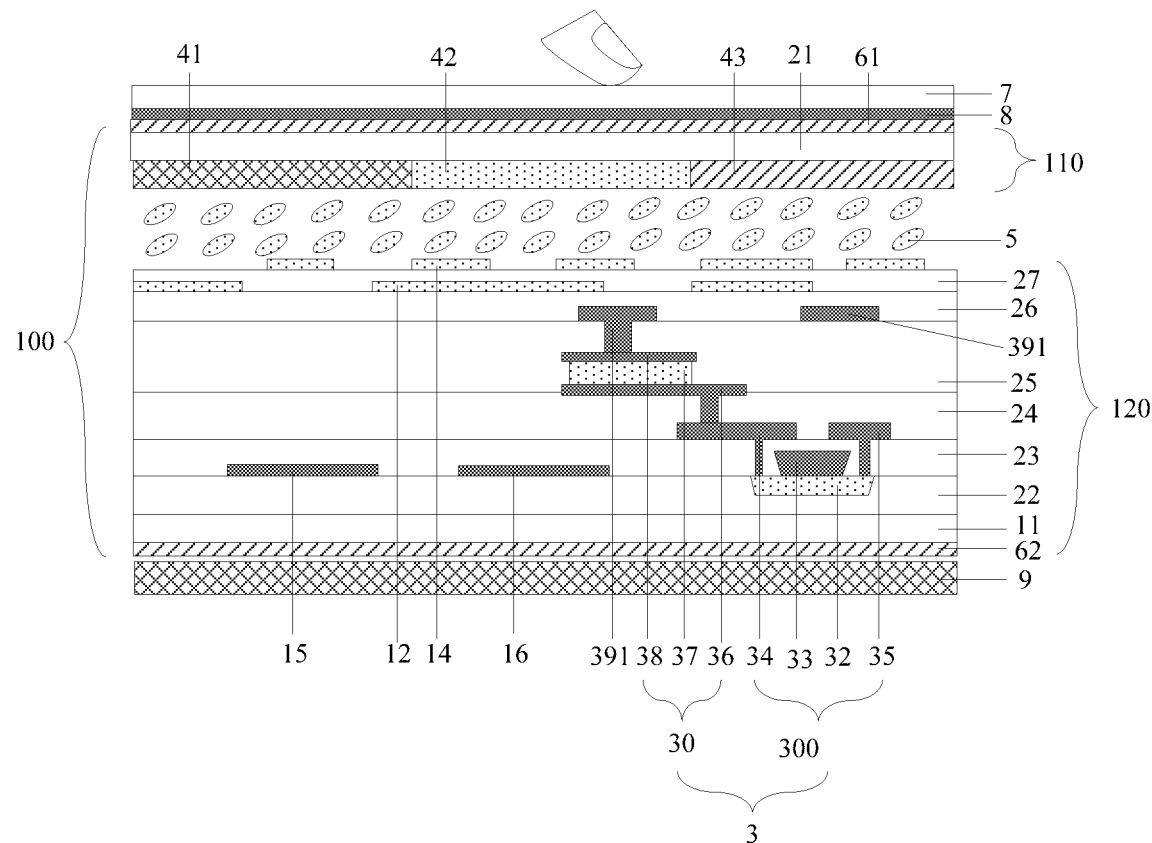
FIG. 9 is a schematic structural diagram of a fingerprint recognition component located on an array substrate provided by an embodiment of the present disclosure.

For another example, referring to FIG. 9, the fingerprint recognition component 3 is integrated on the array substrate 110. For example, the fingerprint recognition component 3 is integrated on a side, facing the color film substrate 110, of the array substrate 120.

For example, as shown in FIG. 9, when the fingerprint recognition component 3 is integrated on the array substrate 120, the array substrate 120 includes sequentially the transistor 300 located on the second substrate 11 and configured to drive the recognition devices 30, and the recognition devices 30 located on a side, facing away from a substrate 11, of the transistor 300. The transistor 300 may include the first insulating layer 22, the active layer 32, a gate layer (the gate layer may include a gate 33, an emitter electrode 15, and a receiver electrode 16), the second insulating layer 23, the source and drain layer (which may include the source electrode 34 and the drain electrode 35), and the third insulating layer 24 which are sequentially located on the second substrate 11. Each recognition device 30 may include the second electrode 36, a photosensitive film 37 and the first electrode 38 which are sequentially located on the third insulating layer 24. The planarization layer 25, the third electrode 391, the fourth insulating layer 26, the common electrode 12, the fifth insulating layer 27, and a pixel electrode 14 are sequentially disposed in the array substrate 110 on a side, facing away from the photosensitive film layer 37, of the first electrode 38. The substrate 21 (that is, the first substrate), and the red color filter 41, the green color filter 42 and the blue color filter 43 located on the side, facing the array substrate 120, of the substrate 21 may be disposed on the color film substrate 110. The display module 100 may also be provided with the liquid crystal layer 5 between the color film substrate 110 and the array substrate 120. The first polarizer 61 may be disposed on the side, facing away from the array substrate 120, of the color film substrate 110. The second polarizer 62 may also be disposed on the side, facing away from the color film substrate 110, of the array substrate 120. The backlight source 9 may be disposed on the side, facing away from the packaging cover plate 7, of the display module 100.

Based on the same inventive concept, embodiments of the present disclosure further provide a display apparatus, including the display panel as provided by the embodiments of the present disclosure.

Figure 10:
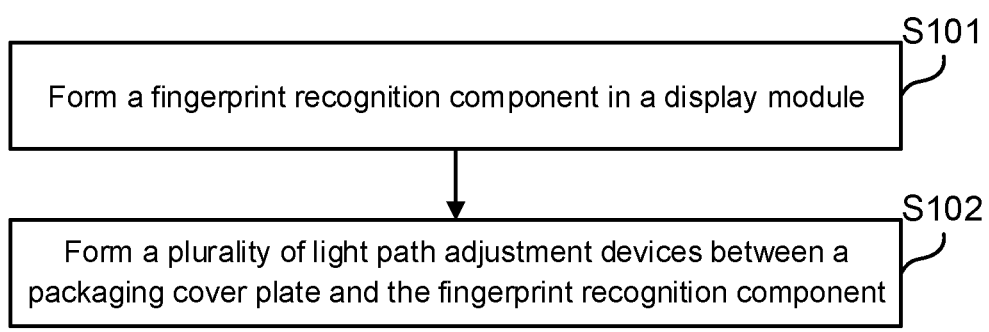
FIG. 10 is a schematic diagram of a process for preparing a display panel provided by an embodiment of the present disclosure.

Based on the same inventive concept, referring to FIG. 10, embodiments of the present disclosure further provide a method for preparing the display panel as provided by the embodiments of the present disclosure. The method includes the following operations.

Operation S101, a fingerprint recognition component is formed in a display module.

Operation S102, a plurality of light path adjustment devices are formed between a packaging cover plate and the fingerprint recognition component. For example, about operation S102, the forming the plurality of light path adjustment devices between the packaging cover plate and the fingerprint recognition component, includes the following sub-operations.

Sub-operation 51021, a plurality of optical fiber structures are formed on one side of the packaging cover plate through a nano imprinting process.

Sub-operation S1022, a first protective layer is formed on a side, facing away from the packaging cover plate, of the optical fiber structures.

Sub-operation S1023, a plurality of convex lens structures are formed on a side, facing away from the optical fiber structures, of the first protective layer through the nano imprinting process.

Sub-operation 51024, the packaging cover plate formed with the convex lens structures and the optical fiber structures are attached to a light emergent side of the display module.

In some embodiment, about operation S101, the forming the fingerprint recognition component(s) in the display module, includes the following sub-operations.

Sub-operation S1011, the fingerprint recognition component is formed on a side of a substrate of a color film substrate.

Sub-operation S1012, a second protective layer is formed on a side, facing away from the substrate, of the fingerprint recognition component.

Sub-operation S1013, a color film layer is formed on a side, facing away from the fingerprint recognition component, of the second protective layer.

Sub-operation S1014, the color film substrate formed with the color film layer and an array substrate are oppositely combined to form the display module.

The beneficial effects of the embodiments of the present disclosure are as follows: in the embodiments of the present disclosure, by arranging the light path adjustment devices between the packaging cover plate and the fingerprint recognition component, the light path adjustment devices can adjust a light path of light incident on the light path adjustment devices and reflected by a finger, so as to reduce the angle of divergence of light entering the fingerprint recognition component. That is, the angle of divergence of the relatively diverged light originally incident on the fingerprint recognition component can be reduced, so that the problem that as the angle of divergence of the light is relatively large, the light spots (stripes) reflected from the fingerprint peaks and valleys cannot be clearly separated on the fingerprint sensor, which leads to the decline in the recognition ability of the fingerprint recognition component is solved.

It will be apparent to those skilled in the art that various modifications and variations can be made in the present disclosure without departing from the spirit or scope of the present disclosure. Thus, if these modifications and variations of the present disclosure fall within the scope of the claims of the present disclosure and its equivalent technology, the present disclosure is also intended to include these modifications and variations.

What is claimed is:
1. A display panel, comprising:
 a display module, comprising a fingerprint recognition component;
 a packaging cover plate, located on a light emergent side of the display module; and
 a plurality of light path adjustment devices, located between the packaging cover plate and the fingerprint recognition component;
 wherein each of the light path adjustment devices comprises:
  an optical fiber structure; and
  a convex lens structure disposed opposite to the optical fiber structure and on a side, facing away from the packaging cover plate, of the optical fiber structure;
 wherein the light path adjustment devices are configured to adjust incident light reflected by a finger, so as to reduce an angle of divergence of light entering the fingerprint recognition component; and
 a center of a light outlet of the optical fiber structure overlaps with a focal point of the convex lens structure.

2. The display panel according to claim 1, wherein,
 the fingerprint recognition component comprises a plurality of recognition devices distributed in an array;
 the plurality of light path adjustment devices are distributed in an array; and
 an overlap region exists between an orthographic projection of one of the recognition devices on the packaging cover plate and an orthographic projection of at least one light path adjustment device on the packaging cover plate.

3. The display panel according to claim 1, wherein a first protective layer is disposed between the optical fiber structure and the convex lens structure.

4. The display panel according to claim 3, wherein a refractive index of the first protective layer is smaller than a refractive index of the optical fiber structure and smaller than a refractive index of the convex lens structure.

5. The display panel according to claim 1, wherein the light path adjustment devices are integrated on the packaging cover plate, and integrated on a side, facing the display module, of the packaging cover plate.

6. The display panel according to claim 1, wherein the display module comprises:
   a color film substrate; and
   an array substrate disposed opposite to the color film substrate;
   wherein the light path adjustment devices are integrated on the color film substrate.

7. The display panel according to claim 6, wherein the color film substrate comprises:
   a first substrate;
   wherein the light path adjustment devices are integrated on a side, facing away from the array substrate, of the first substrate.

8. The display panel according to claim 7, wherein the display panel further comprises:
   a first polarizer, located on a side, facing away from the first substrate, of the light path adjustment devices.

9. The display panel according to claim 8, wherein the color film substrate further comprises:
   a color film layer located on a side, facing away from the first polarizer, of the first substrate;
   wherein the fingerprint recognition component is integrated on the color film substrate and integrated between the first substrate and the color film layer.

10. The display panel according to claim 6, wherein the fingerprint recognition component is integrated on the array substrate and integrated on a side, facing the color film substrate, of the array substrate.

11. A display apparatus, comprising the display panel according to claim 1.

12. A method for preparing the display panel according to claim 1, comprising:
   forming the fingerprint recognition component in the display module; and
   forming the plurality of light path adjustment devices between the packaging cover plate and the fingerprint recognition component.

13. The method for preparing the display panel according to claim 12, wherein said forming the plurality of light path adjustment devices between the packaging cover plate and the fingerprint recognition component, comprises:
   forming a plurality of optical fiber structures on a side of the packaging cover plate through a nano imprinting process;
   forming a first protective layer on a side, facing away from the packaging cover plate, of the optical fiber structures;
   forming a plurality of convex lens structures on a side, facing away from the optical fiber structures, of the first protective layer through the nano imprinting process; and
   attaching the packaging cover plate formed with the convex lens structures and the optical fiber structures to the light emergent side of the display module.

14. The method for preparing the display panel according to claim 12, wherein said forming the fingerprint recognition component in the display module, comprises:
   forming the fingerprint recognition component on a side of a first substrate of a color film substrate;
   forming a second protective layer on a side, facing away from the first substrate, of the fingerprint recognition component;
   forming a color film layer on a side, facing away from the fingerprint recognition component, of the second protective layer; and
   oppositely combining the color film substrate formed with the color film layer and an array substrate to form the display module.

* * * * *